(12) United States Patent
Pai et al.

(10) Patent No.: US 11,537,177 B2
(45) Date of Patent: Dec. 27, 2022

(54) TOUCH PAD STRUCTURE

(71) Applicant: Acer Incorporated, New Taipei (TW)

(72) Inventors: Ting-Wen Pai, New Taipei (TW);
Yan-Lin Kuo, New Taipei (TW);
Chih-Chun Liu, New Taipei (TW);
Hung-Jen Su, New Taipei (TW);
Dong-Sheng Wu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/531,804

(22) Filed: Nov. 22, 2021

(65) Prior Publication Data
US 2022/0342442 A1 Oct. 27, 2022

(30) Foreign Application Priority Data

Apr. 21, 2021 (TW) .................................. 110114239

(51) Int. Cl.
*G06F 1/16* (2006.01)
*G06F 3/0354* (2013.01)
*G06F 3/041* (2006.01)

(52) U.S. Cl.
CPC .......... *G06F 1/169* (2013.01); *G06F 3/03547* (2013.01); *G06F 3/041* (2013.01)

(58) Field of Classification Search
CPC ....... G06F 1/169; G06F 3/03547; G06F 3/041
See application file for complete search history.

(56) References Cited

U.S. PATENT DOCUMENTS

| 8,829,378 | B2 * | 9/2014 | Villain | G06F 3/041 |
| | | | | 345/173 |
| 8,866,033 | B2 * | 10/2014 | Xue | G06F 1/169 |
| | | | | 200/343 |
| 9,958,907 | B2 * | 5/2018 | Kitamura | G06F 3/03547 |
| 10,606,377 | B1 * | 3/2020 | Huang | G06F 1/169 |
| 10,725,567 | B1 * | 7/2020 | Huang | G06F 1/1671 |
| 10,861,659 | B1 * | 12/2020 | Chen | H01H 21/24 |
| 10,921,865 | B2 * | 2/2021 | Huang | G06F 3/03547 |
| 11,287,907 | B1 * | 3/2022 | Li | G06F 3/03547 |
| 11,372,457 | B1 * | 6/2022 | Lee | G06F 1/169 |
| 11,402,931 | B1 * | 8/2022 | Lee | G06F 1/169 |

(Continued)

FOREIGN PATENT DOCUMENTS

TW M624447 U * 3/2022

*Primary Examiner* — Nidhi Thaker
(74) *Attorney, Agent, or Firm* — JCIPRNET

(57) ABSTRACT

A touch pad structure, including a casing having an opening, a touch pad disposed in the opening, an actuating component swingingly disposed in the casing, a switch, and a supporting plate detachably disposed in the casing, is provided. The touch pad has a fulcrum end connected to the casing and a free end opposite thereto. The actuating component is disposed corresponding to the free end and has a fulcrum portion, a first contacting portion, and a second contacting portion. The first contacting portion is located between the fulcrum portion contacting the touch pad and the second contacting portion. The switch is disposed at the free end and located between the touch pad and the first contacting portion. The supporting plate is disposed corresponding to the free end. The actuating component is located between the supporting plate and the switch. The first or second contacting portion abuts against the supporting plate.

10 Claims, 6 Drawing Sheets

(56) References Cited

U.S. PATENT DOCUMENTS

2019/0317602 A1\* 10/2019 Chen .................. G06F 3/03547
2019/0384426 A1\* 12/2019 Huang ................. G06F 1/169
2022/0050500 A1\* 2/2022 Liu .................... G06F 3/03547

\* cited by examiner

TOUCH PAD STRUCTURE

CROSS-REFERENCE TO RELATED APPLICATION

This application claims the priority benefit of Taiwan application serial no. 110114239, filed on Apr. 21, 2021. The entirety of the above-mentioned patent application is hereby incorporated by reference herein and made a part of this specification.

BACKGROUND

Technical Field

The disclosure relates to a touch pad structure, and particularly relates to a touch pad structure applied to a notebook computer.

Description of Related Art

Due to the characteristics of high operating performance, multi-tasking, easy portability, etc., notebook computers have become an indispensable tool for modern people in life or work. Generally speaking, a notebook computer includes a first body and a second body pivotally connected to the first body. The first body is a host with capabilities such as logic operation and data access, and the second body is a display with display capability. In order to facilitate the user to operate or input information, the first body is generally equipped with a keyboard and a touch pad, and the user may execute actions such as moving a cursor, selecting an application item, scrolling a web page or document, and zooming a web page or document through the touch pad.

As far as the design of the existing touch pad is concerned, the touch pad includes a fulcrum end and a free end opposite to the fulcrum end. The fulcrum end is connected to a casing of the first body, and a switch (for example, a dome switch) is disposed at the free end. When a finger of the user taps the touch pad, the free end swings downward relative to the fulcrum end and moves toward a boss, so that the boss contacts and actuating components the switch. Based on the principle of the lever, it can be known that if the force exertion point on the touch pad is too close to the fulcrum end, it is not easy to drive the free end to swing downward relative to the fulcrum end, causing the boss to be unable to contact and trigger the switch, which is fairly inconvenient for the user to operate. In other words, the operable range of the touch pad is limited. Once the finger of the user is too close to the fulcrum end, it may not be possible to execute actions such as moving a cursor, selecting an application item, scrolling a web page or document, and zooming a web page or document.

SUMMARY

The disclosure provides a touch pad structure, which has excellent operating convenience and flexibly adjustable operating range.

The disclosure provides a touch pad structure, which includes a casing, a touch pad, an actuating component, a switch, and a supporting plate. The casing has an opening. The touch pad is disposed in the opening. The touch pad has a fulcrum end and a free end opposite to the fulcrum end, and the fulcrum end is connected to the casing. The actuating component is swingingly disposed in the casing. The actuating component is disposed corresponding to the free end of the touch pad and has a fulcrum portion, a first contacting portion, and a second contacting portion. The first contacting portion is located between the fulcrum portion and the second contacting portion, and the fulcrum portion is connected to the touch pad. The switch is disposed at the free end of the touch pad and is located between the touch pad and the first contacting portion of the actuating component. The supporting plate is detachably disposed in the casing. The supporting plate is disposed corresponding to the free end of the touch pad, and the actuating component is located between the switch and the supporting plate. Under a first mode, the second contacting portion of the actuating component abuts against the supporting plate. Under a second mode, the first contacting portion of the actuating component abuts against the supporting plate.

Based on the above, in the touch pad structure of the disclosure, one end of the actuating component is connected to the touch pad, and the other end of the actuating component abuts against the supporting plate. When the user taps the touch pad, the free end of the touch pad swings downward relative to the fulcrum end and synchronously drives the actuating component. Since the actuating component is supported by the supporting plate, the actuating component swings upward and moves closer to the switch to compress and trigger the switch. Since the position of the supporting plate may be adjusted, by adjusting a portion in the actuating component abutting against the supporting plate, the magnitude of the required downward pressure when the user operates the touch pad can be adjusted while adjusting the magnitude of the operating range of the touch pad. Therefore, the touch pad structure has excellent operating convenience and flexibly adjustable operating range.

In order for the features and advantages of the disclosure to be more comprehensible, the following specific embodiments are described in detail in conjunction with the accompanying drawings.

DETAILED DESCRIPTION OF DISCLOSED EMBODIMENTS

Figure 1:
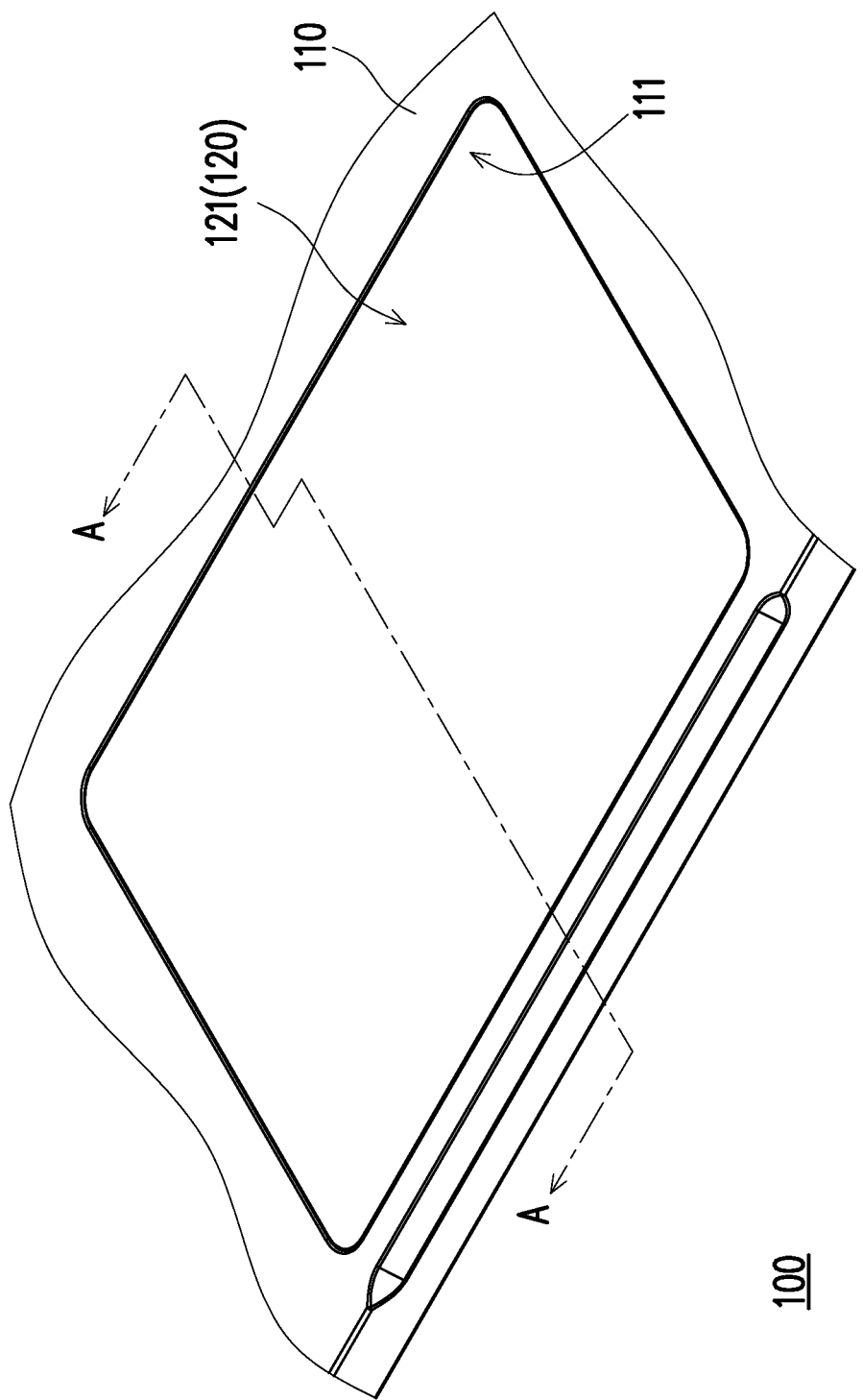
FIG. 1 is a partial schematic view of a touch pad structure according to an embodiment of the disclosure.

It should be noted that a portion of the casing, for example, the lower casing is omitted from FIG. 1 to FIG. 6. In addition, FIG. 2 and FIG. 5 correspond to a first mode, and FIG. 3 and FIG. 6 correspond to a second mode. Please refer to FIG. 1 to FIG. 3. In this embodiment, a touch pad structure 100 may be disposed in a host of a notebook computer for the user to execute actions such as moving a cursor, selecting an application item, scrolling a web page or document, and zooming a web page or document. In detail, the touch pad structure 100 includes a casing 110, a touch pad 120, an actuating component 130, a switch 140, and a supporting plate 150. The casing 110 has an opening 111, and the touch pad 120 is disposed in the opening 111. An operating surface 121 of the touch pad 120 is exposed outside the casing 110 from the opening 111 for the finger of the user to tap the operating surface 121 or slide on the operating surface 121.

Figure 2:
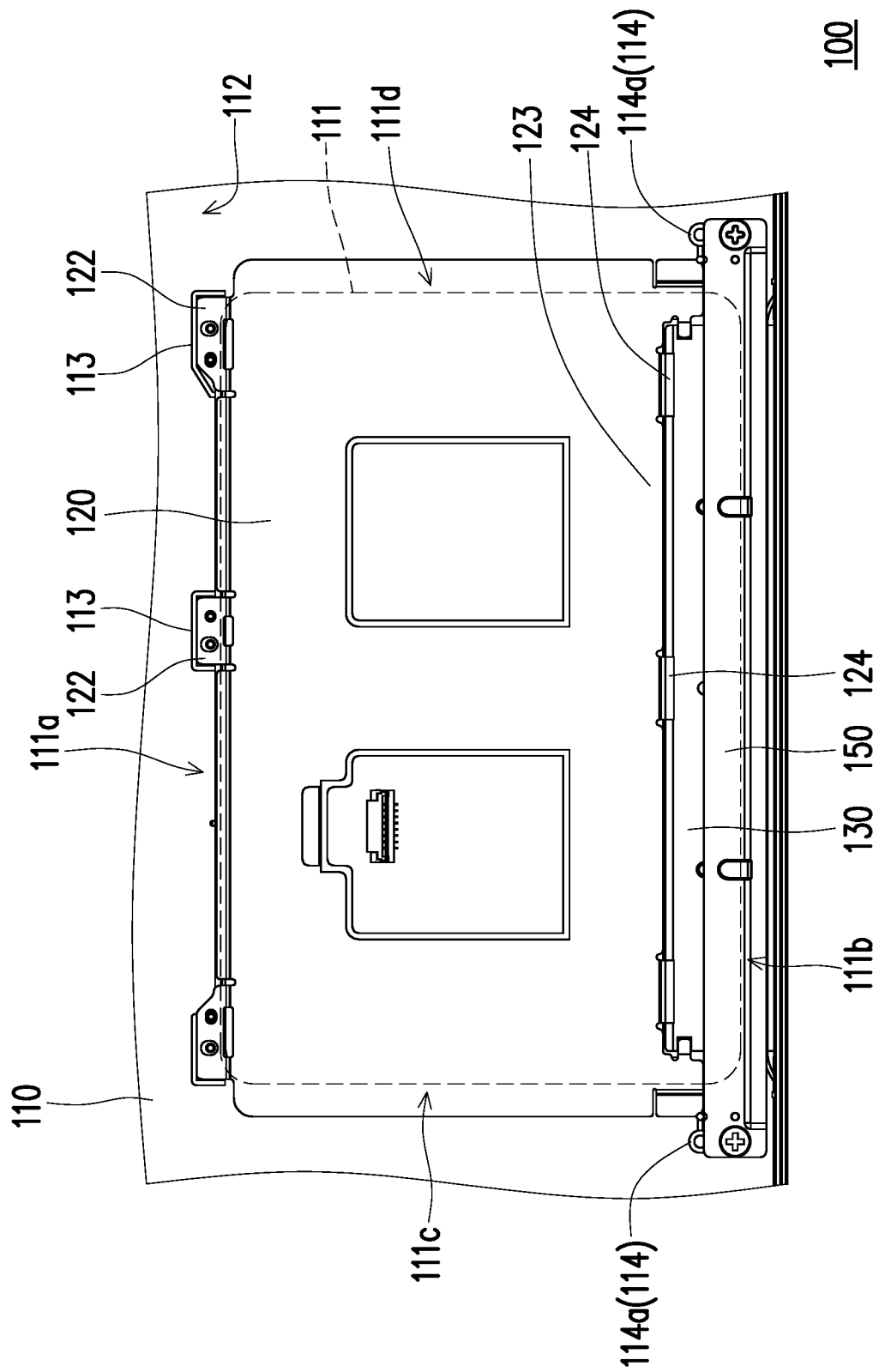
FIG. 2 and FIG. 3 are bottom schematic views of the touch pad structure of FIG. 1 under two different modes.
Figure 5:
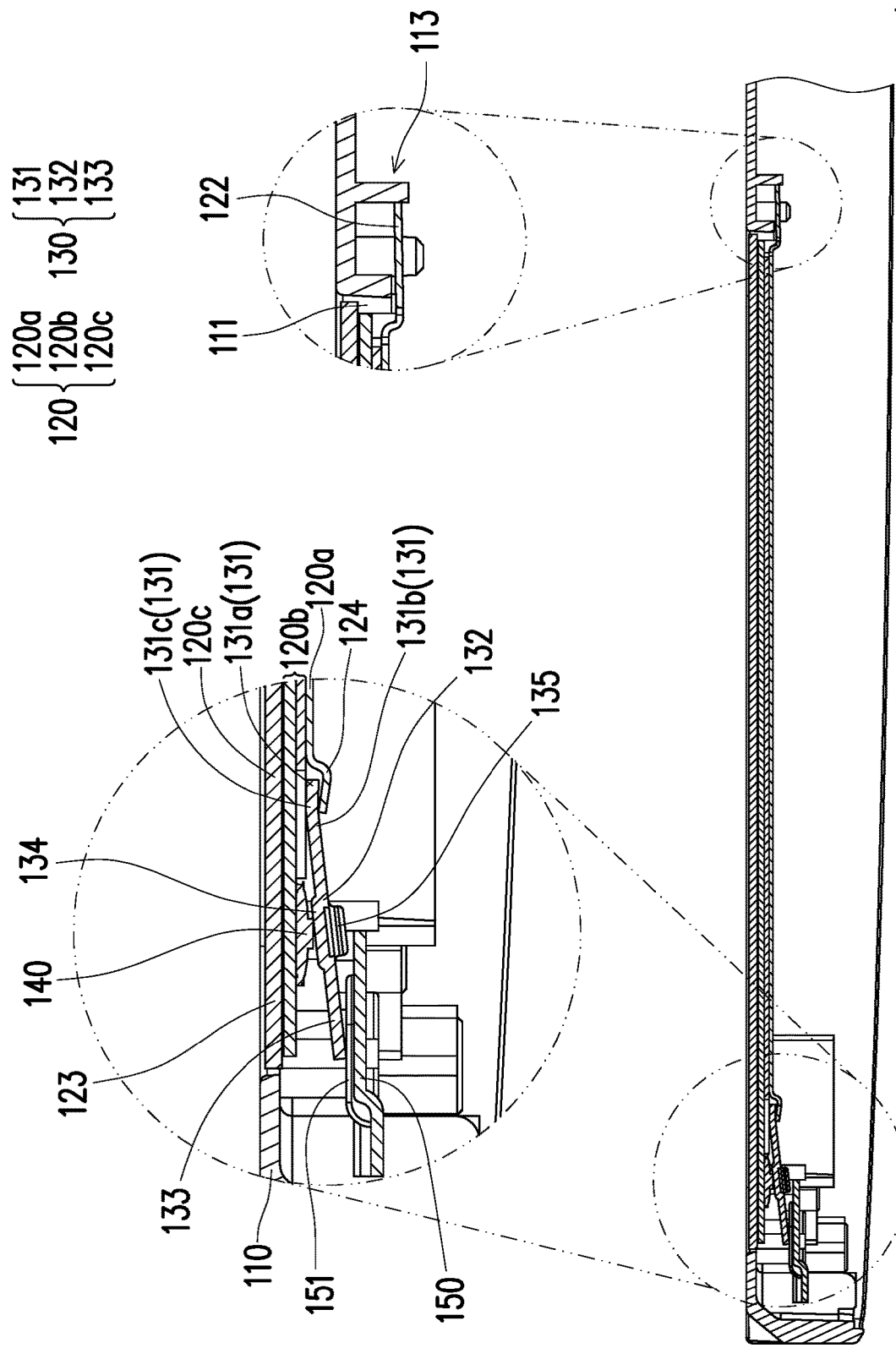
FIG. 5 and FIG. 6 are cross-sectional schematic views of the touch pad structure of FIG. 1 under the two different modes along a section line A-A.

Please refer to FIG. 1, FIG. 2, and FIG. 5, the touch pad 120 has a fulcrum end 122 and a free end 123 opposite to the fulcrum end 122. The fulcrum end 122 extends outside the opening 111 and is connected to an inner surface 112 of the casing 110. In addition, the free end 123 falls within the opening 111. When the finger of the user taps the operating surface 121 of the touch pad 120, the free end 123 swings downward relative to the fulcrum end 122. When the finger of the user moves away from the operating surface 121, the free end 123 swings upward relative to the fulcrum end 122 and returns to an initial position.

The casing 110 may be an upper casing of the host of the notebook computer. The actuating component 130 is swingingly disposed in the casing 110 and is disposed corresponding to the free end 123 of the touch pad 120. The switch 140 is disposed at the free end 123 of the touch pad 120 and is located between the touch pad 120 and the actuating component 130. The switch element 140 may be a dome switch and contacts the actuating component 130. The supporting plate 150 is disposed in the casing 110. The supporting plate 150 is disposed corresponding to the free end 123 of the touch pad 120, and the actuating component 130 is located between the switch 140 and the supporting plate 150.

In detail, the actuating component 130 has a fulcrum portion 131, a first contacting portion 132, and a second contacting portion 133. The first contacting portion 132 is located between the fulcrum portion 131 and the second contacting portion 133, and the switch 140 is located between the touch pad 120 and the first contacting portion 132. The fulcrum portion 131 of the actuating component 130 is connected to the touch pad 120. The first contacting portion 132 and the second contacting portion 133 are separated from the touch pad 120, and the first contacting portion 132 contacts the switch 140. In addition, the fulcrum portion 131 is closer to the fulcrum end 122 of the touch pad 120 than the first contacting portion 132 and the second contacting portion 133.

Under the first mode shown in FIG. 5, the second contacting portion 133 of the actuating component 130 abuts against the supporting plate 150. When the finger of the user taps the operating surface 121 of the touch pad 120, the free end 123 of the touch pad 120 swings downward relative to the fulcrum end 122 and synchronously drives the actuating component 130. Since the second contacting portion 133 of the actuating component 130 is supported by the supporting plate 150, the first contacting portion 132 and the second contacting portion 133 swing upward relative to the fulcrum portion 131, and the first contacting portion 132 compresses the switch 140 to trigger the switch 140.

Figure 6:
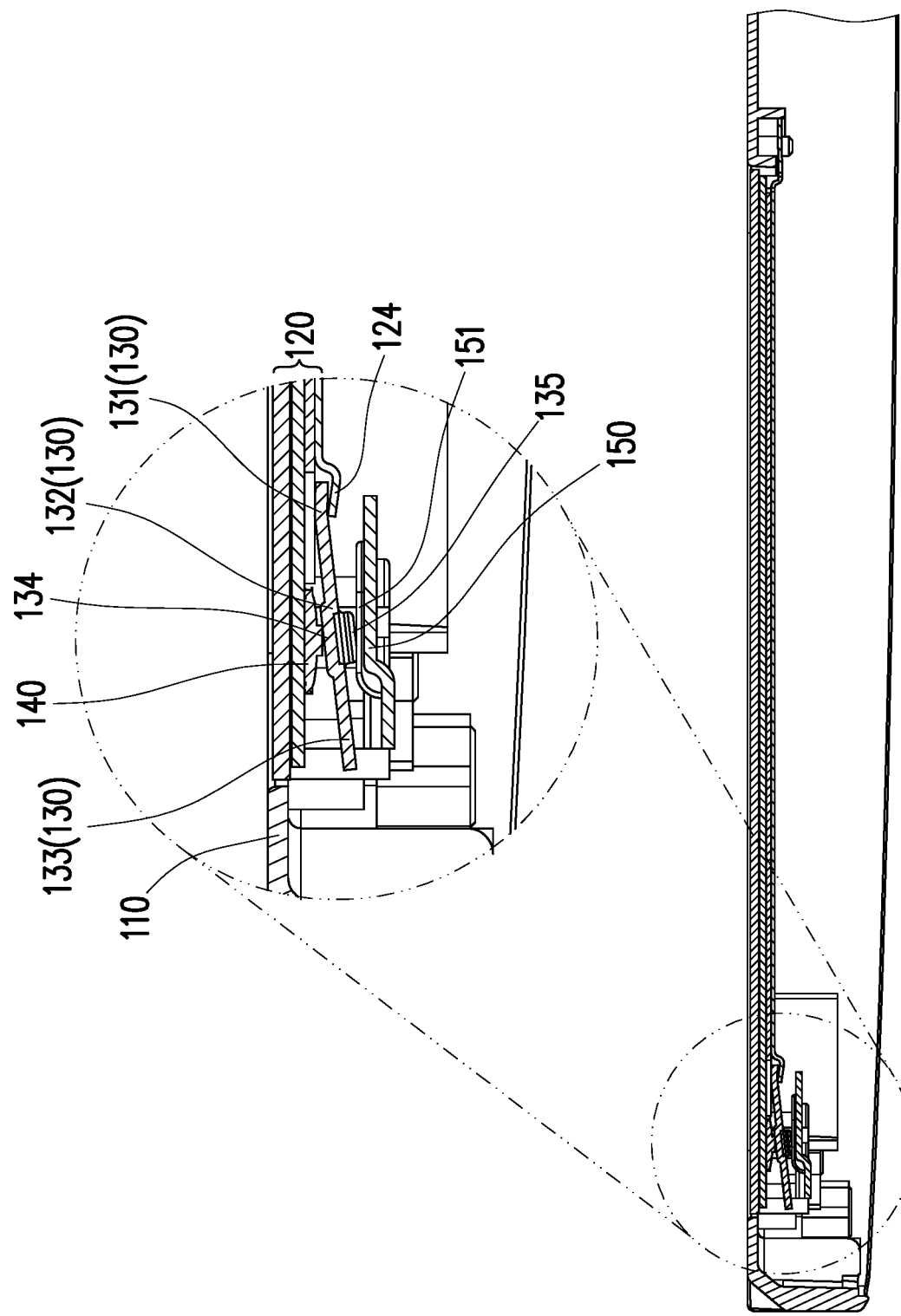

Under the second mode shown in FIG. 6, the first contacting portion 132 of the actuating component 130 abuts against the supporting plate 150. When the finger of the user taps the operating surface 121 of the touch pad 120, the free end 123 of the touch pad 120 swings downward relative to the fulcrum end 122 and synchronously drives the actuating component 130. Since the first contacting portion 132 of the actuating component 130 is supported by the supporting plate 150, the first contacting portion 132 and the second contacting portion 133 swing upward relative to the fulcrum portion 131, and the first contacting portion 132 compresses the switch 140 to trigger the switch 140.

As shown in FIG. 5, the second contacting portion 133 of the actuating component 130 abuts against the supporting plate 150, and there is a first moment arm between a place where the second contacting portion 133 abuts against the supporting plate 150 and the fulcrum portion 131. As shown in FIG. 6, the first contacting portion 132 of the actuating component 130 abuts against the supporting plate 150, and there is a second moment arm less than the first moment arm between a place where the first contacting portion 132 abuts against the supporting plate 150 and the fulcrum portion 131.

Based on the principle of the lever, assuming that the user exerts downward pressure on the same position of the touch pad 120, under the first mode, the user must exert a first downward pressure on the touch pad 120 to drive the actuating component 130 to trigger the switch 140. Under the second mode, the user must exert a second downward pressure on the touch pad 120 to drive the actuating component 130 to trigger the switch 140. The second downward pressure is greater than the first downward pressure.

Based on the principle of the lever, assuming that the user exerts the same third downward pressure on the touch pad 120, under the first mode, the user must exert the third downward pressure within a first operating range of the touch pad 120 to drive the actuating component 130 to trigger the switch 140. In addition, under the second mode, the user must exert the third downward pressure within a second operating range of the touch pad 120 to drive the actuating component 130 to trigger the switch 140. The second operating range is less than the first operating range.

In other words, by adjusting a portion in the actuating component 130 abutting against the supporting plate 150, the magnitude of the required downward pressure when the user operates the touch pad 120 can be adjusted while adjusting the magnitude of the operating range of the touch pad 120. Therefore, the touch pad structure 100 has excellent operating convenience and flexibly adjustable operating range.

Figure 3:
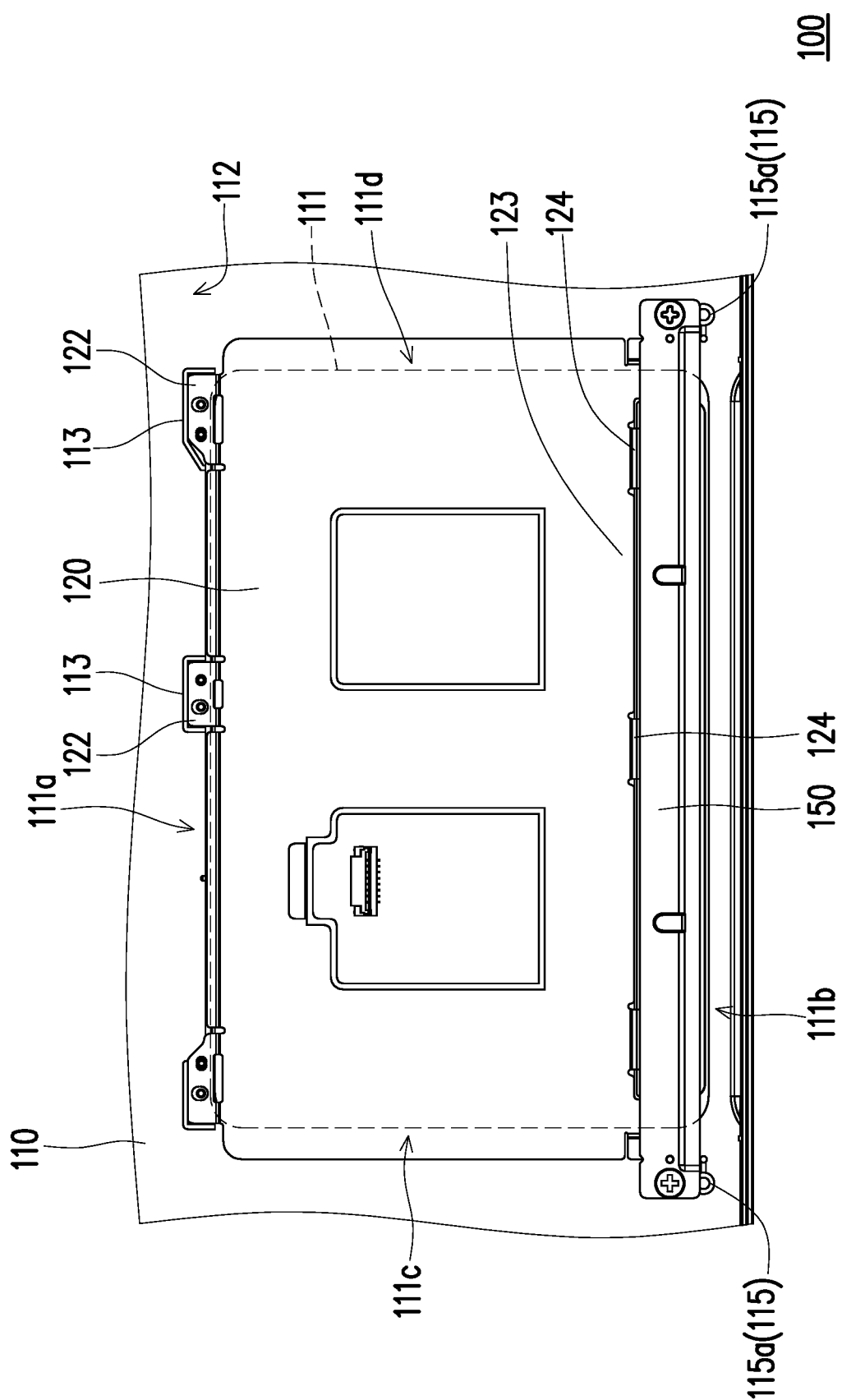
Figure 4:
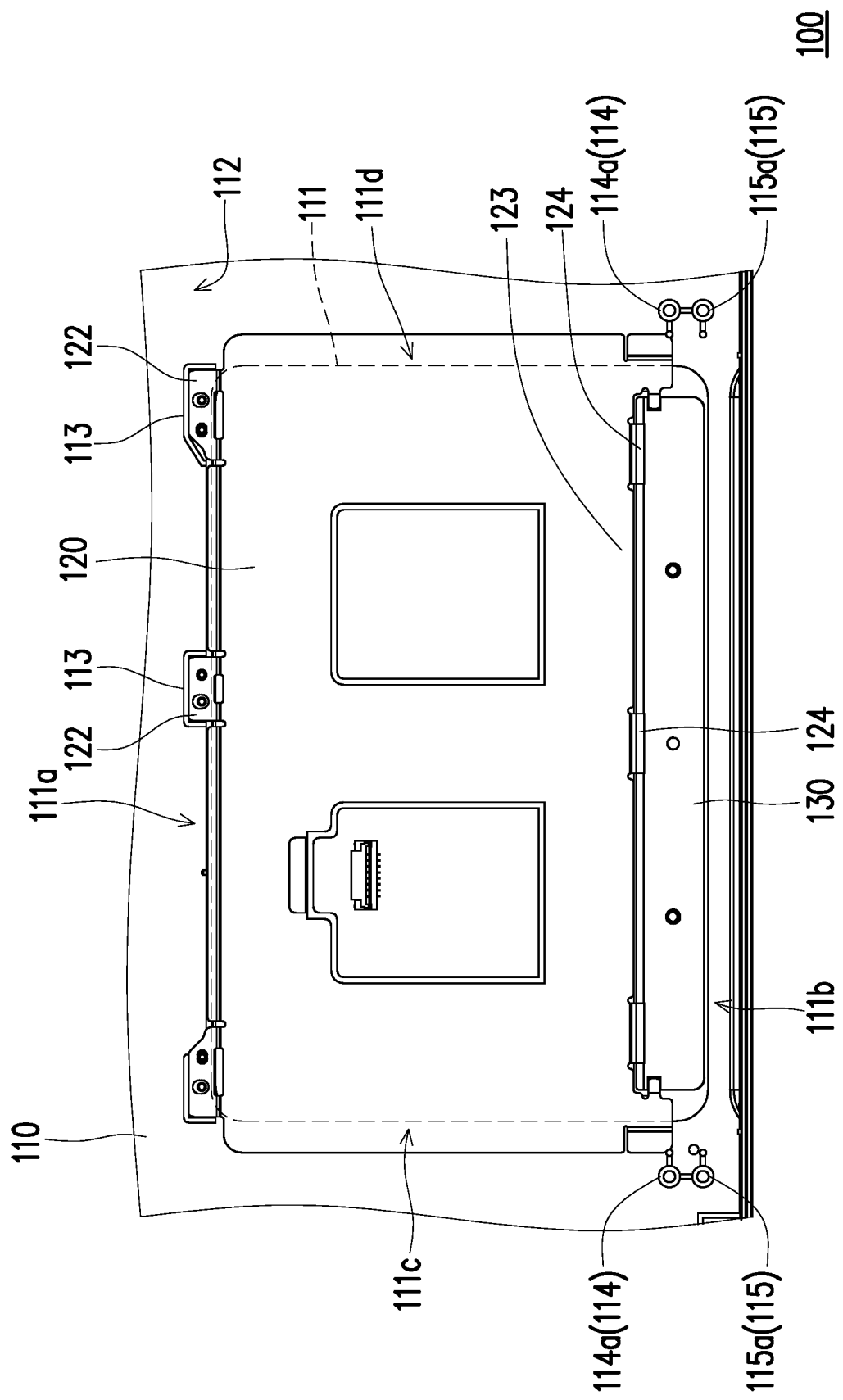
FIG. 4 is a bottom schematic view of the touch pad structure of FIG. 2 after removing a supporting plate.

Please refer to FIG. 2 to FIG. 4. In this embodiment, the casing 110 further has a first positioning portion 113 located at a first side 111a of the opening 111, a second positioning portion 114 adjacent to a second side 111b of the opening 111, and a third positioning portion 115 adjacent to the second side 111b of the opening 111. The first side 111a and the second side 111b are opposite to each other, and the first side 111a is closer to a keyboard on the host of the computer than the second side 111b. On the other hand, the second positioning portion 114 is located between the first positioning portion 113 and the third positioning portion 115. The fulcrum end 122 of the touch pad 120 is installed at the first positioning portion 113, and the free end 123 of the touch pad 120 is adjacent to the second positioning portion 114 and the third positioning portion 115.

As shown in FIG. 2 and FIG. 4, under the first mode, the supporting plate 150 is installed at the third positioning portion 115. The user may detach the supporting plate 150 from the third positioning portion 115 to be installed at the second positioning portion 114 to change to the second mode according to requirements, as shown in FIG. 3 and FIG. 4. In other words, by adjusting the installation position of the supporting plate 150, the portion in the actuating component 130 abutting against the supporting plate 150 can be adjusted.

As shown in FIG. 4, the second positioning portion 114 includes two positioning pillars 114a respectively located at a third side 111c and a fourth side 111d of the opening 111, and the third positioning portion 115 includes two positioning pillars 115a respectively located at the third side 111c and the fourth side 111d of the opening 111. The third side 111c and the fourth side 111d are opposite to each other and are located between the first side 111a and the second side 111b. In detail, the positioning pillar 114a and the positioning pillar 115a located at the third side 111c of the opening 111 are arranged on a straight line, and the positioning pillar 114a and the positioning pillar 115a located at the fourth side 111d of the opening 111 are arranged on another straight line for the user to detach and install the supporting plate 150. In addition, the positioning pillar 114a is closer to the first positioning portion 113 than the positioning pillar 115a located on the same side of the opening 111.

As shown in FIG. 2 and FIG. 4, under the first mode, two ends of the supporting plate 150 are respectively locked to the two positioning pillars 115a of the third positioning portion 115. The user may detach the supporting plate 150 from the third positioning portion 115 and respectively lock the two ends of the supporting plate 150 to the two positioning pillars 114a of the second positioning portion 114 to change to the second mode according to requirements, as shown in FIG. 3 and FIG. 4. On the other hand, the supporting plate 150 overlaps with the opening 111 of the casing 110 and extends from the third side 111c to the fourth side 111d of the opening 111 along the second side 111b, as shown in FIG. 2 and FIG. 3.

Please refer to FIG. 2, FIG. 3, FIG. 5, and FIG. 6. The supporting plate 150 overlaps with the actuating component 130, and the supporting plate 150 has a supporting protrusion 151 facing the actuating component 130. Under the first mode shown in FIG. 2 and FIG. 5, the second contacting portion 133 of the actuating component 130 contacts the supporting protrusion 151, and the first contacting portion 132 is separated from the supporting protrusion 151. Under the second mode shown in FIG. 3 and FIG. 6, the first contacting portion 132 of the actuating component 130 contacts the supporting protrusion 151, and the second contacting portion 133 is separated from the supporting protrusion 151.

Please refer to FIG. 5 and FIG. 6. The actuating component 130 further has a first protrusion 134 protruding from one side of the first contacting portion 132 and a second protrusion 135 protruding from the other side of the first contacting portion 132. The first protrusion 134 faces the touch pad 120 and contacts the switch 140, so that the pressed touch pad 120 can be prevented from falling down instantaneously to avoid a sense of nothing in terms of operation. On the other hand, the second protrusion 135 faces the supporting plate 150. Under the first mode shown in FIG. 5, the second protrusion 135 is separated from the supporting plate 150. Under the second mode shown in FIG. 6, the second protrusion 135 contacts the supporting plate 150 and may contact the supporting protrusion 151.

Please refer to FIG. 5 and FIG. 6. In this embodiment, the touch pad 120 further has a pressing portion 124 located at the free end 123, and the pressing portion 124 is pressed against the fulcrum portion 131 of the actuating component 130. Furthermore, the fulcrum portion 131 includes a first extension section 131a, a second extension section 131b, and a turning section 131c located between the first extension section 131a and the second extension section 131b. The first extension section 131a and the turning section 131c may contact the touch pad 120, and the second extension section 131b is connected to the first contacting portion 132 of the actuating component 130. There is an included angle between the first extension section 131a and the second extension section 131b to form the turning section 131c. One side of the turning section 131c contacts the touch pad 120 and the pressing portion 124 is pressed against the other side of the turning section 131c to prevent the actuating component 130 from being separated from the touch pad 120 and prevent the fulcrum portion 131 from arbitrarily sliding relative to the touch pad 120.

The touch pad 120 includes a supporting frame 120a, a circuit plate 120b disposed on the supporting frame 120a, and a cap plate 120c disposed on the circuit plate 120b. The cap plate 120c is exposed outside the casing 110 from the opening 111, and the operating surface 121 is located on the cap plate 120c. The switch 140 is disposed on the circuit plate 120b and is electrically connected to the circuit plate 120b. The pressing portion 124 may be an elastic buckle arm formed on the supporting frame 120a, and the fulcrum portion 131 of the actuating component 130 is clamped between the pressing portion 124 and the circuit plate 120b. In addition, the pressing portion 124 and the fulcrum end 122 are respectively located at two sides of the supporting frame 120a.

In summary, in the touch pad structure of the disclosure, one end of the actuating component is connected to the touch pad, and the other end of the actuating component abuts against the supporting plate. When the user taps the touch pad, the free end of the touch pad swings downward relative to the fulcrum end and synchronously drives the actuating component. Since the actuating component is supported by the supporting plate, the actuating component swings upward and moves closer to the switch to compress and trigger the switch. Since the position of the supporting plate may be adjusted, by adjusting a portion in the actuating component abutting against the supporting plate, the magnitude of the required downward pressure when the user operates the touch pad can be adjusted while adjusting the magnitude of the operating range of the touch pad. Therefore, the touch pad structure has excellent operating convenience and flexibly adjustable operating range.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A touch pad structure, comprising:
   a casing, having an opening;
   a touch pad, disposed in the opening, wherein the touch pad has a fulcrum end and a free end opposite to the fulcrum end, and the fulcrum end is connected to the casing;
   an actuating component, swingingly disposed in the casing, wherein the actuating component is disposed corresponding to the free end of the touch pad and has a fulcrum portion, a first contacting portion, and a second contacting portion, wherein the first contacting portion is located between the fulcrum portion and the second contacting portion, and the fulcrum portion is connected to the touch pad;
   a switch, disposed at the free end of the touch pad and located between the touch pad and the first contacting portion of the actuating component; and
   a supporting plate, detachably disposed in the casing, wherein the supporting plate is disposed corresponding to the free end of the touch pad, the actuating component is located between the switch and the supporting plate, under a first mode, the second contacting portion of the actuating component abuts against the supporting plate, and under a second mode, the first contacting portion of the actuating component abuts against the supporting plate.

2. The touch pad structure according to claim 1, wherein the casing further has a first positioning portion located at a first side of the opening, a second positioning portion adjacent to a second side of the opening, and a third positioning portion adjacent to the second side of the opening, the second positioning portion is located between the first positioning portion and the third positioning portion, the fulcrum end of the touch pad is installed at the first positioning portion, the free end of the touch pad is adjacent to the second positioning portion and the third positioning portion, under the first mode, the supporting plate is installed at the third positioning portion, and under the second mode, the supporting plate is installed at the second positioning portion.

3. The touch pad structure according to claim 2, wherein each of the second positioning portion and the third positioning portion comprises two positioning pillars respectively located at a third side and a fourth side of the opening, the supporting plate extends from the third side to the fourth side of the opening, under the first mode, the supporting plate is locked to the two positioning pillars of the third positioning portion, and under the second mode, the supporting plate is locked to the two positioning pillars of the second positioning portion.

4. The touch pad structure according to claim 1, wherein the supporting plate overlaps with the opening of the casing.

5. The touch pad structure according to claim 1, wherein the touch pad further has a pressing portion located at the free end, and the pressing portion is pressed against the fulcrum portion.

6. The touch pad structure according to claim 5, wherein the fulcrum portion comprises a first extension section, a second extension section, and a turning section located between the first extension section and the second extension section, the second extension section is connected to the first contacting portion, one side of the turning section contacts the touch plate, and the pressing portion is pressed against other side of the turning section.

7. The touch pad structure according to claim 5, wherein the touch pad comprises a supporting frame, a circuit plate disposed on the supporting frame, and a cap plate disposed on the circuit plate, the cap plate is exposed outside the casing from the opening, and the switch is disposed on the circuit plate, wherein the pressing portion is formed on the supporting frame, and the fulcrum portion of the actuating component is clamped between the pressing portion and the circuit plate.

8. The touch pad structure according to claim 1, wherein the actuating component part further has a first protrusion protruding from one side of the first contacting portion and a second protrusion protruding from other side of the first contacting portion, the first protrusion contacts the switch, under the first mode, the second protrusion is separated from the supporting plate, and under the second mode, the second protrusion contacts the supporting plate.

9. The touch pad structure according to claim 1, wherein the supporting plate has a supporting protrusion facing the actuating component, under the first mode, the second contacting portion of the actuating component contacts the supporting protrusion, and under the second mode, the first contacting portion of the actuating component contacts the supporting protrusion.

10. The touch pad structure according to claim 1, wherein the supporting plate overlaps with the actuating component.

* * * * *